US007067824B2

(12) United States Patent
Muller et al.

(10) Patent No.: US 7,067,824 B2
(45) Date of Patent: Jun. 27, 2006

(54) METHOD, DEVICE AND SECURITY SYSTEM, ALL FOR AUTHENTICATING A MARKING

(75) Inventors: Edgar Muller, Fribourg (CH); Philipp Egger, Lausanne (CH); Myron Seto, Lausanne (CH)

(73) Assignee: SICPA Holding S.A., Prilly (CH)

( * ) Notice: Subject to any disclaimer, the term of this patent is extended or adjusted under 35 U.S.C. 154(b) by 240 days.

(21) Appl. No.: 10/257,983

(22) PCT Filed: Apr. 28, 2001

(86) PCT No.: PCT/EP01/04809

§ 371 (c)(1),
(2), (4) Date: Nov. 5, 2002

(87) PCT Pub. No.: WO01/88846

PCT Pub. Date: Nov. 22, 2001

(65) Prior Publication Data

US 2004/0031931 A1      Feb. 19, 2004

(30) Foreign Application Priority Data

May 16, 2000   (EP) ................................. 00110404

(51) Int. Cl.
*F21V 9/16* (2006.01)
(52) U.S. Cl. .................................. 250/458.1
(58) Field of Classification Search ............ 250/458.1; 435/6; 356/364; 382/150
See application file for complete search history.

(56) References Cited

U.S. PATENT DOCUMENTS

| 4,047,033 | A | * | 9/1977 | Malmberg et al. ........ 250/341.1 |
| 4,374,328 | A |   | 2/1983 | Tekippe et al. |
| 4,442,170 | A |   | 4/1984 | Kaule et al. |
| 6,066,459 | A | * | 5/2000 | Garini et al. .................... 435/6 |
| 6,373,570 | B1 | * | 4/2002 | McFarland et al. ......... 356/364 |
| 6,528,801 | B1 | * | 3/2003 | Luryi et al. ............... 250/459.1 |
| 6,549,647 | B1 | * | 4/2003 | Skunes et al. .............. 382/150 |
| 2002/0158212 | A1 | * | 10/2002 | French et al. ............ 250/459.1 |

FOREIGN PATENT DOCUMENTS

| DE | 44 01 351   | 7/1995 |
| GB | 2095822     | 10/1982 |
| RU | 2112957     | 6/1998 |
| WO | WO 00/19428 | 4/2000 |

* cited by examiner

*Primary Examiner*—David Porta
*Assistant Examiner*—Marcus Taningco
(74) *Attorney, Agent, or Firm*—Shoemaker and Mattare (57) ABSTRACT

A luminescent probe marking is excited with at least one excitation pulse of at least one excitation source. The probe intensity values of emission intensity from emission radiation of the luminescent probe marking are measured in response to the excitation pulse(s) at time intervals. A probe intensity-versus-time emission function is formed of the probe intensity values, and the probe intensity-versus-time emission function is compared with at least one reference intensity-versus-time emission function after the probe intensity-versus-time emission function and the reference intensity-versus-time emission function have been normalized.

17 Claims, 10 Drawing Sheets

Emission spectrum of up-converting phosphors

METHOD, DEVICE AND SECURITY SYSTEM, ALL FOR AUTHENTICATING A MARKING

FIELD OF INVENTION

The invention is in the field of security markings, applied through inks or coating compositions or in bulk materials, and of documents or articles carrying such security markings. It concerns a novel method for exploiting the characteristics of certain luminescent pigments incorporated into said inks, coating compositions or articles. In particular, it deals with a method and a device allowing to exploit the characteristic luminescent afterglow of certain luminescent materials and luminescent compounds and proposes a security system for marking and authenticating an item.

BACKGROUND OF THE INVENTION

Luminescent materials are among the classic ingredients of security inks or coatings. They convert energy of an exciting radiation of a given wavelength into emitted light of another wavelength. The exploited luminescent emission can lie in the UV range (below 400 nm), in the visible range (400–700 nm) or in the near to mid infrared range (700–2500 nm) of the electromagnetic spectrum. Certain luminescent materials can emit simultaneously at more than one wavelength. Most luminescent materials can be excited at more than one wavelength.

If the emitted radiation has a longer wavelength than the exciting radiation, one speaks of "Stokes" or "down-converting" luminescence. If the emitted radiation has a shorter wavelength than the exciting radiation, one speaks of "anti-Stokes" or "up-converting" luminescence.

Luminescence can be of two different types: fluorescence or phosphorescence. Fluorescence is the prompt emission of radiation upon excitation, whereas phosphorescence is the time-delayed emission of radiation, observable after the excitation has been stopped. Phosphorescence, also called afterglow, is characterized by a specific decay of the luminescence intensity in function of time; the corresponding lifetimes, which are material-specific, can range from the nanosecond to the multi-hour time scale.

Luminescent materials can be of organic or of inorganic nature. Examples of the former are the cyanine type molecules, as well as the coumarines, rhodamines etc. Examples of the latter are the copper or silver doped zinc sulfides, the rare-earth doped yttrium aluminum garnets or yttrium vanadates, etc. Another class of luminescents can be found among the metallo-organic compounds, e.g. the silicon phthalocyanines, the rare-earth beta-diketonates etc.

Luminescent materials can be employed in inks or coatings either as pigments or as soluble materials. Newer developments have also made available luminescent pigments in colloidal form. Particular applications rely as well on luminescent polymers, obtained by polymerizing, copolymerising or grafting luminescent molecules into or onto a polymer chain.

All of these compound classes and application forms have been used in security compositions and for security purposes. Corresponding detecting equipment can be made to discriminate between prompt luminescence (fluorescence) or delayed luminescence (phosphorescence).

U.S. Pat. No. 3,473,027 deals with the general use of organic and inorganic rare-earth compounds as visible and IR luminescent markers for applications such as goods identification and labels, personal identification, identification and registration of passing vehicles, machine reading of information, ZIP codes, invoices, tags etc. and high capacity storage devices. The patent further describes a "spectroscopic detector" for discriminating between different narrow-line luminescent responses.

U.S. Pat. No. 3,412,245 adds the decay-time characteristics of the luminescence to the encoding factors. In this way, rare-earth based luminescents, having decay times of the order of milliseconds, can be distinguished from much more rapidly decaying organic fluorescent material. The discrimination is done via excitation with sinusoidally modulated or pulsed UV light sources, using variable modulation or pulse frequency, in conjunction with spectral separation of the different emission wavelengths.

U.S. Pat. No. 3,582,623 and U.S. Pat. No. 3,663,813 reveal further developments of spectroscopic detecting equipment for luminescent features.

U.S. Pat. No. 3,650,400 describes the use of a pulsating light source, in conjunction with synchronous detection at the pulsating frequency ("lock-in" principle), to suppress the influence of ambient light. By this means, the detector is only sensitive to the luminescent's proper response. The principal shortcoming of methods of the prior art, which rely on a determination of the material's modulation-transfer function, is their inherent slowness. For these reason they are not normally implemented on high-speed authenticating machines.

U.S. Pat. No. 4,047,033 describes the use of an up-converting luminescent material for security purposes, as well as corresponding detecting equipment. Detection relies on excitation with a GaAs IR-LED, emitting at 950 nm wavelength in continuous or pulsed mode, combined with spectroscopic identification of the luminescent emission. Reference is made to indirect means, by measuring pulse dephasing, for assessing the characteristic rise and decay times of the luminescent's response. This method is, however, strongly affected by variations in luminescence intensity, and therefore not easy to implement in practice.

Another method of the prior art, suited for high-speed authentication, relies on pulse-excitation of a moving test sample on a conveyor belt. After passing the UV excitation source, the intensity of the induced luminescence decays according to the intrinsic decay characteristics of the material. One or several photodetectors, placed at determined distances from the UV source along the conveyor belt, are used to assess specific points of said decay characteristics. The main drawback of this method is its limitation to such phosphorescent materials which have characteristic luminescence decay times of the order of 50 milliseconds. This limitation is a consequence of the mechanical constraints (conveyor belt speed) of the detecting process.

It is an object of the present invention to provide a method, a device and a security system which overcome the shortcomings of the prior art. In particular, the invention shall permit a rapid sampling of a luminescence decay characteristic and shall be, therefore, suitable for high-speed machine reading applications.

Furthermore, the invention shall allow a wide choice of up-or down-converting phosphorescent materials, having decay times from the sub-microseconds to the ten milliseconds range or longer. A further particular object of the invention is to render the authentication process more reliable by compensating for alterations of luminescence intensity, which may occur due to changes in the luminecent marking itself (ageing, dirtiness) or in the measuring equipment.

SUMMARY OF THE INVENTION

The above objects are primarily achieved by a method, a device and a security system for authenticating a luminescent probe marking and according to the independent claims. The invention is based on a comparison of the time-dependent luminescence emission functions of a probe material with that of a reference material. Therefore, according to the invention, curve shapes are used as the authenticating feature, rather than intensity values of individual measurements. Said emission functions are compared in normalized form. In doing so, the comparison becomes largely independent of intensity deviations due to aging, alterations or dirtiness.

The invention relies further on the direct assessment of the time-dependent luminescence emission function of a probe marking following pulse excitation. The luminescent may hereby be excited using any kind of intense, pulsed radiation source, for example light emitting diodes, laser diodes, Q-switched lasers and light sources derived thereof by nonlinear optics, as well as X-ray pulses or particle beams, in particular pulsed electron beams. After excitation with an appropriate excitation pulse, preferably with a light pulse of appropriate wavelength and duration, the luminescent material emits part of the absorbed energy in the form of emission radiation of a second wavelength. In some cases, said emission of radiation occurs almost immediately, and stops with the excitation stopping. In other cases, the emission is time-delayed and the intensity of the emitted radiation follows either a simple exponential decay law, or more complicated laws of hyperbolic shape, or even shows a rise and decay behavior, representative of complicated internal energy transfer processes and of competing decay mechanisms. In every case, however, the observed evolution of the emission intensity as a function of time, after the ceasing of the external stimulation, depends only on the luminescent material itself, and serves thus as an authenticating feature, indicating the presence of said specific material. Even if the absolute luminescence intensity is reduced, e.g. by aging or dirtiness of the material, the shape of the emission-versus-time function is preserved, as it is typical for a luminescent compound.

In the context of this invention, decay or decay-curve shall mean any specific intensity-versus-time function of a probe and its reference. Such an intensity-versus-time function represents the measured response of the luminescence emission intensity due to an excitation pulse. The term "excitation source" shall furthermore apply to electromagnetic sources of radiation having a wavelength comprised between 200 mm and 2500 nm, including thus UV light, visible Light, and short-wavelength (non-thermal) IR light. Alternative methods of stimulation, using e.g. X-ray or electron-beam pulses are possible and included by said definition as well.

In performing the method and using the authenticating device the emission intensity of a probe is sampled at appropriate time intervals and stored in an analog memory, e.g. digitized by an analog-to-digital (AD) converter and stored in a digital memory.

A reference curve of the luminescent's emission as a function of time, taken on a reference sample by using the same instrumental set-up and procedure, is stored in a digital memory, too, and provided for comparison and authentication.

Authentication of a probe under test is performed by a point-by-point comparison of its luminescence decay curve with the stored reference sample's decay curve.

Probe and reference emission functions are compared in normalized form. Normalization implies that the intensity values of both emission functions are put to scale, such that the highest values of both decay curves coincide.

If said comparison of the probe decay curve with the corresponding reference decay curve confirms identity within definable tolerances, a conformity signal is provided to authenticate the probe. In the opposite case, non-conformity is assumed. The conformity-or non-conformity-signal may be any electric, optical, acoustic or other signal.

Said definable tolerance may be conceived on a point-by-point base, i.e. each probe curve point is compared with its corresponding reference curve point and must lie within absolute (e.g. +50/−30), relative (e.g. ±20%) or individually defined limits from that reference curve point. On the point-by-point base, all points must lie inside their respective tolerances for the probe sample to be accepted.

Alternatively, an overall tolerance criterion may be applied; i.e. the individual differences of corresponding probe and reference intensities, or some convenient function thereof like the squares or the absolute values, etc., are summed up over all points, and the resulting sum is checked against said overall tolerance criterion.

The method of the invention has the advantage of being applicable to any type of luminescence decay characteristics, be it exponential or not. It is in particular applicable to the authentication of mixtures of luminescents having a same particular luminescent center in environments with different decay characteristics. E.g. a mixture of $YVO_4$:Eu and $Y_2O_2S$:Eu can be distinguished in this way from its single components.

The method according to the invention can be laid out such that a "single shot" measurement i.e. a single excitation light pulse followed by the acquisition of the corresponding luminescence response as a function of time, lasting in the order of a millisecond, is sufficient to collect the complete luminescence decay information of a probe and to compare it with the reference data. Hence, high speed operation on fast moving samples is herewith assured.

However, in the case of a weak luminescence, i.e. of an insufficient signal-to-noise (S/N) ratio, the measurement can also be repeated a certain number of times and the results of more than one of said "shots" can be averaged together on a point by point base to improve the S/N ratio and hence to obtain the desired decay curve information with a higher statistical precision.

It is a further advantage of the method of the present invention that it is model-free, i.e. that the luminescence decay curve itself is used as the authenticating feature, rather than a parameter derived thereof. Derivation of parameters is always tied to a physical model and becomes inapplicable in case the model does not hold. Model-free methods have therefore a far larger application range than model-tied ones.

The method according to the invention can be used in conjunction with other existing techniques for the spectral identification of luminescent responses. In particular, it can be used in conjunction with spectral filters, wavelength-dispersive elements, optical gratings or other optical instrumentation which lead to a wavelength selection.

Light collection optics can be used as well, in order to improve the signal-to-noise ratio of the photodetecting chain.

More than one detection channel can be provided for the simultaneous detection of luminescent mixtures, or of luminescents emitting at more than one wavelength simultaneously. The latter is often the case in rare-earth ion based luminescent materials. The different detection channels are hereby provided with appropriate wavelength selectiors, and the corresponding intensity-versus-time data are individually sampled and stored.

In a particular embodiment, the detection channel is a microspectrometer unit, comprising a wavelength-dispersor (e.g. a prism, a grating, or a linearly variable filter) and an array-photodetector. The latter can be a linear photodiode array or a linear CCD (charge coupled device) array. To assure high operation speed, a modified two-dimensional CCD matrix array can be employed in place of the linear CCD array.

In CCD matrix arrays, an image frame of photogenerated charge carriers, produced by the exposure of the silicon chip to light, is "vertically" shifted, line by line, to the edge of the chip, where the individual lines are then "horizontally" shifted and read out, pixel by pixel. These shifting processes are taking place in parallel, and huge amounts of data can be handled very rapidly (typical speeds for a 256×256 CCD array are up to 40 MHz for "horizontal" pixel-to-pixel shifting, and up to 4 MHz for "vertical" line-to-line shifting).

Said modified CCD matrix array is laid out such that a first line of pixels is acting as the photodetector array for the spectrum produced by said wavelength-dispersor. The subsequent lines of pixels are protected from the influence of light and serve as an intermediate mass storage device. Following the excitation pulse, the time-dependent spectral information is acquired by a rapid "vertical" line-to-line shifting and stored in the CCD's light-protected area for subsequent read out by the instrument's processor.

More than one excitation source can be provided, in order to gain hardware flexibility for detecting luminescents having different excitation wavelengths. Light emitting diodes (LEDs) in particular are well suited for the illumination of a spectral range of about 50 nm bandwidth. Providing a set of different LEDs allows to cover a larger spectral area of interest. This multi-LED light source can be controlled by the instruments microprocessor, such that the choice of the excitation wavelength can be performed by mere programming.

It is of particular interest to combine said multi-LED light source with said microspectrometric detector unit, to obtain an universal luminescence/decay time detector module.

According to the invention, the very same equipment can be used to define the reference decay curve and to authenticate an unknown sample. The equipment can thus be operated in a "learning mode", where a reference decay curve (reference intensity-versus-time emission function) is acquired from a reference sample, appropriately processed and the corresponding data stored in a memory. The equipment can also be operated in a "testing mode", where a luminescence decay curve of a probe (probe intensity-versus-time emission function), carrying a marking to be authenticated, is acquired, the corresponding data appropriately processed and compared with the previously stored reference data, in order to derive a conformity/non-conformity indicator. The same device would thus be operated in a "learning mode" to store reference data in the memory, and lateron for testing probes in a "testing mode". The device may also comprise more than one memory segment to provide reference data for the authentication of different markings.

Said "learning mode" and said "testing mode" need not, however, to be necessarily implemented within the same physical unit or device. In an alternative embodiment, a first device is dedicated to the acquisition/definition of a reference decay curve from the reference sample. The reference data are then transferred to the memory of a second, similar, device, which is exclusively dedicated to the authentication of probe samples.

The method and equipment according to the invention can be used to authenticate inks and/or coating compositions comprising suitable luminescent material, as well as articles such as security articles or coated articles realized using said inks and/or coating compositions.

Said method and equipment can furthermore be used to authenticate suitable luminescent bulk material, such as paper or plastic used for the manufacturing of articles such as bank notes, security documents, identity cards, credit cards, security threads, labels and other security articles.

A security system can be realized based on the outlined method by providing a set of reference samples compising luminescent materials and/or luminescent compounds of similar spectral emission (i.e. emission color), but having different time-dependent emission functions. Said reference samples are distinguishable by the method and the device according to the invention, e.g. by incorporating one or more of them into a marking on an item, for authentication purposes.

EXAMPLES

The invention is further exemplified by the embodiments of security systems and of authenticating devices as described below and as shown in the following drawings:

Figure 3:
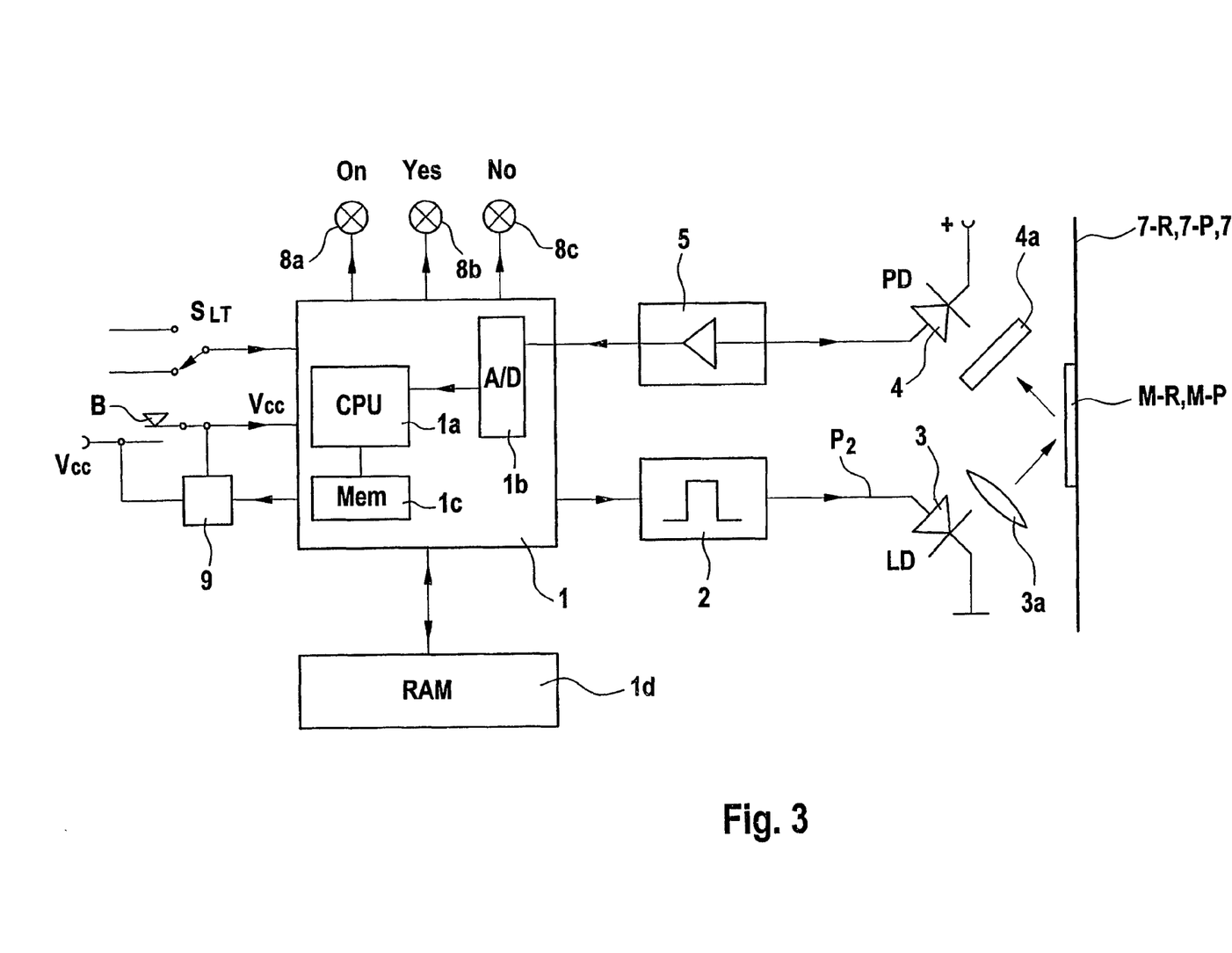
FIG. 3 shows the block diagram of a first embodiment of an authenticating device in accordance with the invention.

A security system according to the invention comprises a microprocessor-based authenticating equipment as shown schematically in FIG. 3.

Figure 1:
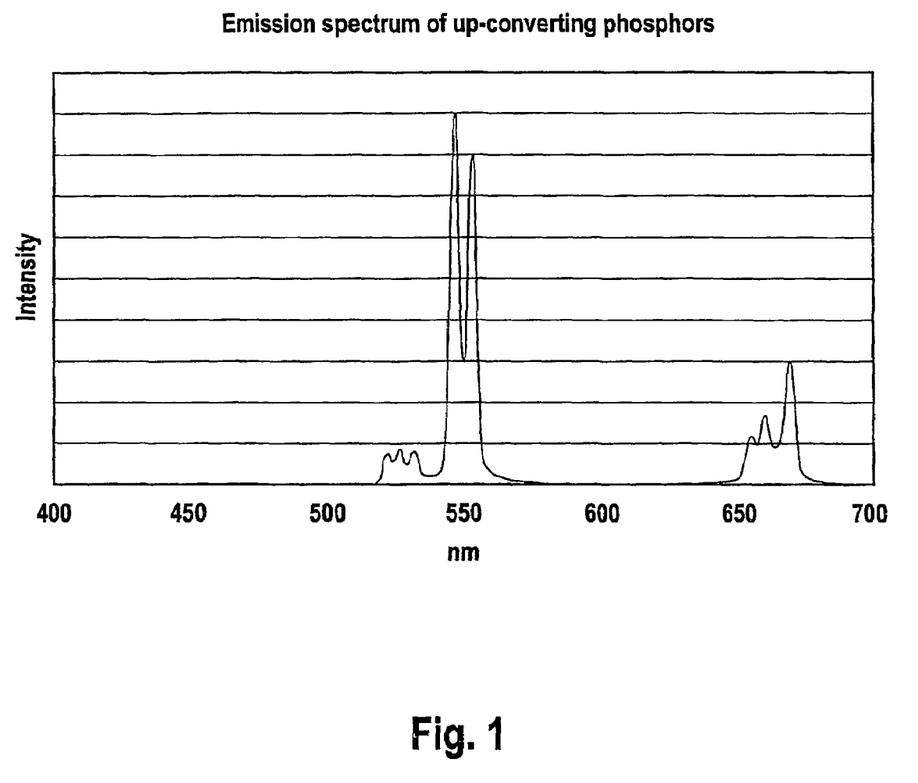
FIG. 1 shows the emission spectrum of an up-converting phosphor which can be used in connection with the invention.
Figure 2:
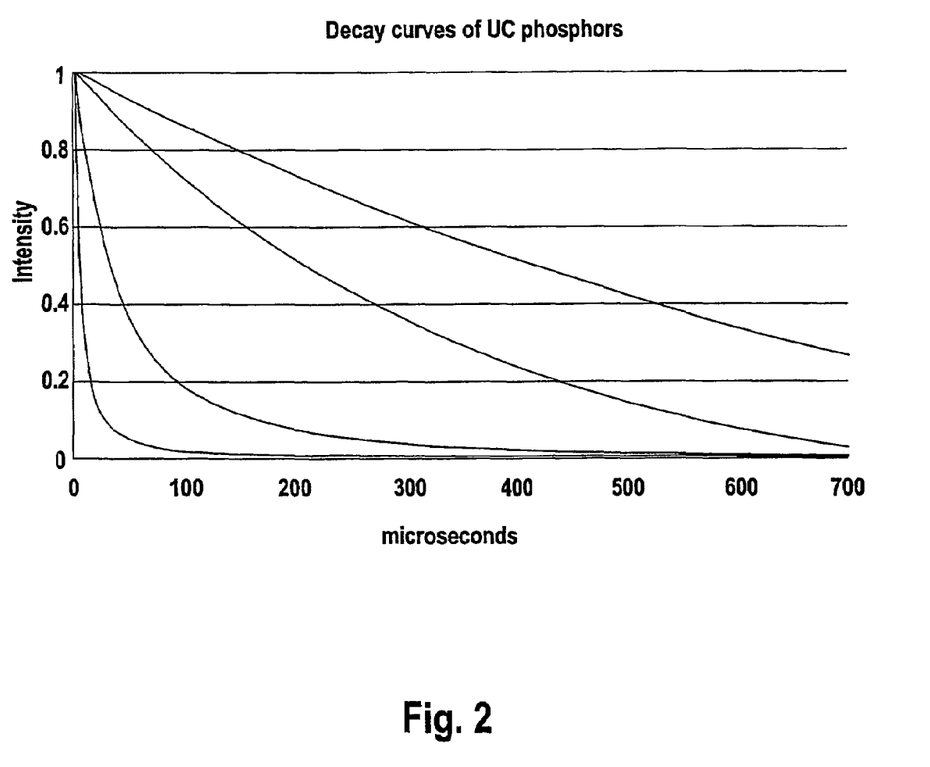
FIG. 2 shows luminescence decay curves of four different up-converting luminescent phosphors, which can be used to constitute a security system according to the invention

As representatives of the collection of luminescent compounds in a marking, four erbium-based up-converting phosphors of different nature were chosen to: $Gd_2O_2S:Er,Yb$; $Y_2O_2S:Er,Yb$; $BaY_2F_8:Er,Yb$; $NaYF_4:Er,Yb$. Up on irradiation with a 950 or 980 nm light source, all of them emit in the green, near 550 nm (FIG. 1). The lifetimes of the green, phosphorescent emissions are, however, very different for the four materials, as shown in FIG. 2.

The authenticating device, as shown in FIG. 3, comprises a microcontroller or processor 1, embodied for example by the ADuC812 MicroConverter™ of Analog Devices. The ADuC812 chip comprises a 16 MHz 8052 microprocessor (CPU) 1a with 32 digital I/O lines, a 5 μs 12 bit analog/digital (A/D) converter 1b, as well as D/A converters, integrated RAM (256 bytes) and EE/Flash memory (Mem) or memory device 1c for program (8K) and data (640 bytes) storage. EE/Flash memory (Mem) 1c is electrically erasable permanent memory and allows for the implementation of a "learning mode". The ADuC812 chip's internal memory was complemented in our example with 32 K of external random access memory (RAM) or memory device 1d.

The authenticating device further contains a laser current driver 2 controlled by the ADuC812, a 980 nm wavelength pulse laser diode (LD) as excitation source 3 with collimator optics 3a, as well as a photodetecting chain based on a green-sensitive commercial GaAsP photodiode (PD) 4, an optional optical filter 4a, and a corresponding amplifier 5. The photodetecting chain 4,5 is laid out such as to guarantee a minimum bandwidth of 200 kHz, corresponding to the ADuC812's 5 μs sampling rate; its output is connected to the ADuC812's A/D converter 1b. The ADuC812 is further connected to a mode switch SLT for the selection of learning/testing mode L/T, to a push-button B for initiating the measurement cycle, as well as to yellow, green and red LEDs 8a, 8b, 8c for indicating the On/off and the approved/failure (Yes/No) states. The push-button B is switching on the circuit's main power supply Vcc. A processor-controlled power-hold switch 9 is provided, allowing the processor to hold its own power for completing the measurement cycle and to switch itself off in good conditions.

Figure 4:
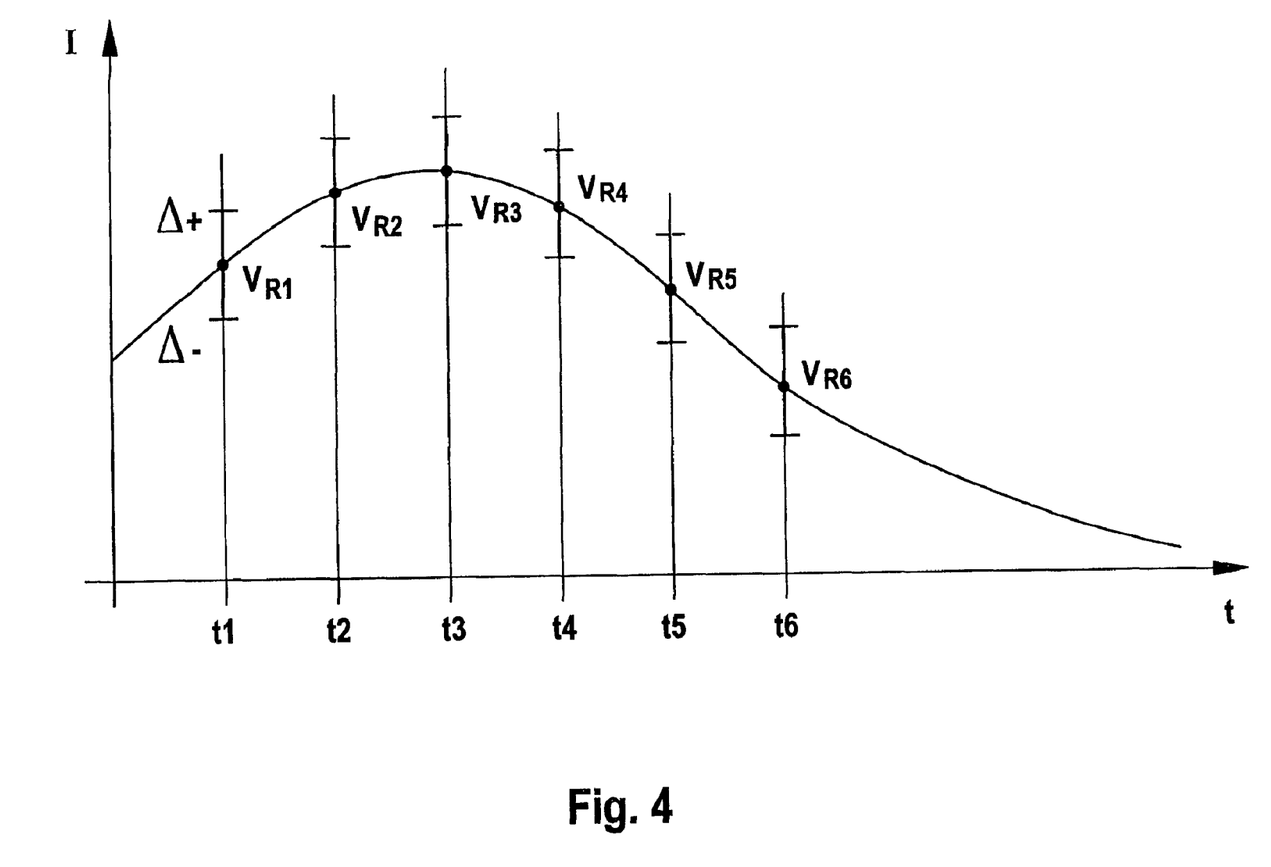
FIG. 4 shows a typical luminescence intensity/time characteristics, which can be used for authenticating purposes in accordance with the present invention.

In the "learning mode" L, a reference decay curve or reference intensity-versus-time emission function is acquired. A reference sample 7-R is placed at the position below collimator optic 3a and optical filter 4a. After setting the SLT switch to "learning mode" L, the pushbutton B is pressed, powering up the detector unit. Controlled by the microprocessor 1, the laser diode of excitation source 3 is addressed with a short current pulse from the laser current driver 2 (typically 1 A during 200 μs). A 980 nm laser excitation pulse P is focussed by the collimator optics 3a onto a luminescent reference marking M-R of reference sample 7-R. The corresponding luminescent response at 550 nm (emission radiation E) is sensed by the photodiode 4. The signal from the photodiode passes into the amplifier 5 and from there into the A/D converter 1b. After pulsing the laser diode, the microprocessor 1 initiates a direct-memory-access (DMA) data acquisition sequence. During this sequence, the signal of the photodetecting chain 4,5 is sampled at regular time intervals (for example every 5 μs) by the A/D converter 1b and stored in subsequent memory locations of the external memory device 1d. Sampling time and number of samples to be taken are preset by the microprocessor's program as a function of the previous results. After termination of the sampling, the data in memory device 1d is analyzed, processed, condensed to 64 data points defining reference values VR1 to VR64 (FIG. 4) and stored in the microconverter's permanent memory device 1c. The function represented by reference values VR1–VR64 is furthermore normalized, i.e. the values VR1–VR6 are scaled with respect to the highest value of the function. Therefore, VR1–VR64 are independent of overall intensity variations affecting the luminescent emission. FIG. 4 illustrates the possible form of this reference curve, which is retained as a list of reference values (VR1, VR2, VR3, . . . ) for the corresponding points in time (t1, t2, t3, . . . ). The VRn values may optionally be associated with corresponding individual tolerances (Δ+, Δ−).

A successful termination of the operation is acknowledged by the green "Yes" indicator 8b. Some seconds after termination of the operations, the microprocessor switches off the detector unit via the power supply switch 9.

In the "testing mode" T a probe decay curve is acquired and compared with the previously stored reference curve. According to FIG. 3 a probe sample 7-P comprising a probe marking M-P is placed at the correct sample position. After setting the SLT switch to "testing mode" T, the trigger pushbutton B is pressed, powering up the authenticating device. The very same sequence of operations as described for the "learning mode" L is performed, up to the point where the measured luminescence decay data is processed and condensed into 64 data points. The so obtained data VP1 to VP64 are normalized as well and compared with the previously stored reference values VR1–VR64. To compare the data representing the decay curve of a probe marking M-P with that of a reference marking M-R, the corresponding data points are in our embodiment subtracted from each other, and the absolute values of the differences are summed up for all 64 data points. If the value of this sum is less than a selectable criterion, the test sample is accepted as being "good" and the green "Yes" LED 8b is activated. If the value of said sum exceeds to said criterion, the test sample is refused as being "bad" and the red "No" LED 8c is activated. Some seconds after termination of the operations, the microprocessor switches off the detector unit via power supply switch 9.

The emission intensity E of a reference sample 7-R or of a sample probe 7-P can vary within a large measure. Aging of the luminescent material or surface alteration of a reference marking M-R or of a probe marking M-P are often the cause. If the marking is, for example, applied to an article 7 such as a banknote or a product tag, the surface of said banknote or the tag may become dirty or scratched. This may substantially reduce the excitation intensity at the luminescent material and may also reduce the intensity of the emission radiation from such a marking. In particular, the emission radiation E of a reference sample 7-R may have higher absolute values than the emission radiation E of a probe sample 7-P.

Therefore, the method according to the invention relies on a comparison of decay curve forms, rather than of individual absolute intensity values.

After normalizing both curves with respect to their highest value between t1 and tn, two identical curves are obtained for samples containing the same luminescent, even if the latter is present in different concentration. By applying this general principle of comparing normalized curves, the authentication process will not be affected by factors resulting in intensity or measurement deviations.

The number of individual data points VP1–VPn and VR1–VRn taken to define probe curve CP and reference curve CR may vary to a high degree. Higher numbers allow generally a more exact definition of a curve.

For practical purposes, a number between 32 and 128 values, preferably 64 values, has proven to be sufficient.

After deriving reference values VR1–VRn in RAM 1d or in permanent memory device 1c, this data may be transferred as reference values VR1–VRn to other authenticating devices.

Similarly, each authenticating device may have a number of memory segments to store reference values VR1–VRn for a number of different markings M. Generally, reference values VR for comparison may be provided in any way; electronic data may be provided i.e. by internal or external memories, by memory card, by wire- or wireless transmission, as an encrypted memory or data attachment to a sample or in any other suitable way.

The ADuC812's central processing unit 1a was programmed so as to perform the outlined operations after a pressing of the pushbutton B. They noteworthy comprise the following functional program blocks:

assure autonomy of power supply during the measurement cycle by setting switch 9 on, read learning/testing mode switch SLT, if learning mode L:

prepare the external memory for DMA data acquisition, pulse the laser diode, acquire a predetermined number of samples of the luminescent's response in DMA mode into memory device 1d, post-process the sampled data and compress it in an optimized form into 64 data points, store the compressed and normalized data, including a compression indicator, in the ADuC812's internal permanent data EE/Flash memory device 1c, as a reference.

if testing mode T:

prepare the external memory for DMA data acquisition, pulse the laser diode, acquire a predetermined number of samples of the luminescent's response in DMA mode into memory device 1d, post-process the sampled data and compress it into 64 normalized data points according to the previously stored compression indicator, compare the compressed and normalized data with the previously stored normalized reference data in memory device 1c, and derive a conformity/non-conformity indicator, set the approved/failure indicator LEDs correspondingly, to show the result, after a waiting period of predetermined length, switch off the power supply via switch 9.

Figure 5:
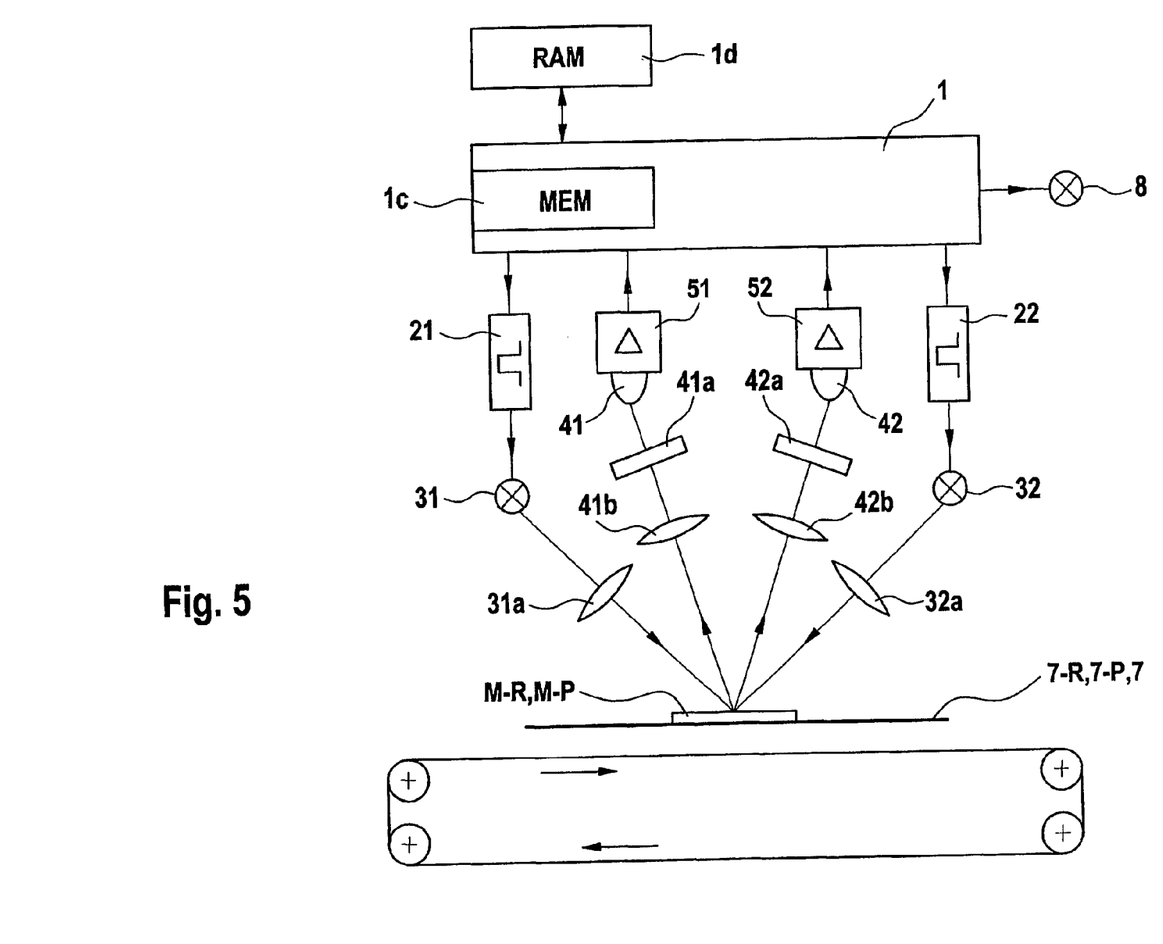
FIG. 5 shows a schematic block diagram for a modified embodiment of a detecting device according to the invention.

In a modified embodiment of an authenticating device according to the invention, schematically shown in FIG. 5, two excitation light sources 31 and 32 for emitting excitation pulses P of different wavelengths, with collimation optics 31a and 32a and corresponding pulse drivers 21 and 22, are provided. Two detection units for two different wavelengths, comprising collimating optics 41b and 42b, filters 41a and 42a, photodetectors 41 and 42, and amplifiers 51 and 52, are provided, too. The optical elements are arranged such that all optical axes intersect at a single observation point on an probe sample 7-P. Said probe sample 7-P, carrying a probe marking M-P, is conveyed through the authenticating device. Depending on the feature to be detected, processor 1 sends a current pulse to light source 31 or to light source 32, or to both of them. Depending on the emission to be detected, use is made of photodetector 41 and/or of photodetector 42.

As example, the device may be laid out for the detection of erbium-based up-converting materials, excited with an excitation source 31 at 980 nm and emitting in the green at 550 nm which will be detected by photodetector 41, simultaneously europium luminescents which are contained in probe marking M-p, are excited by light source 32 at 370 nm and emitting near 610 nm, which will be detected by photodetector 42. Presence of both luminescent materials is required to confirm authenticating of probe marking M-P. The working principles of the device according to this particular embodiment are otherwise the same as those for the first embodiment.

Figure 7:
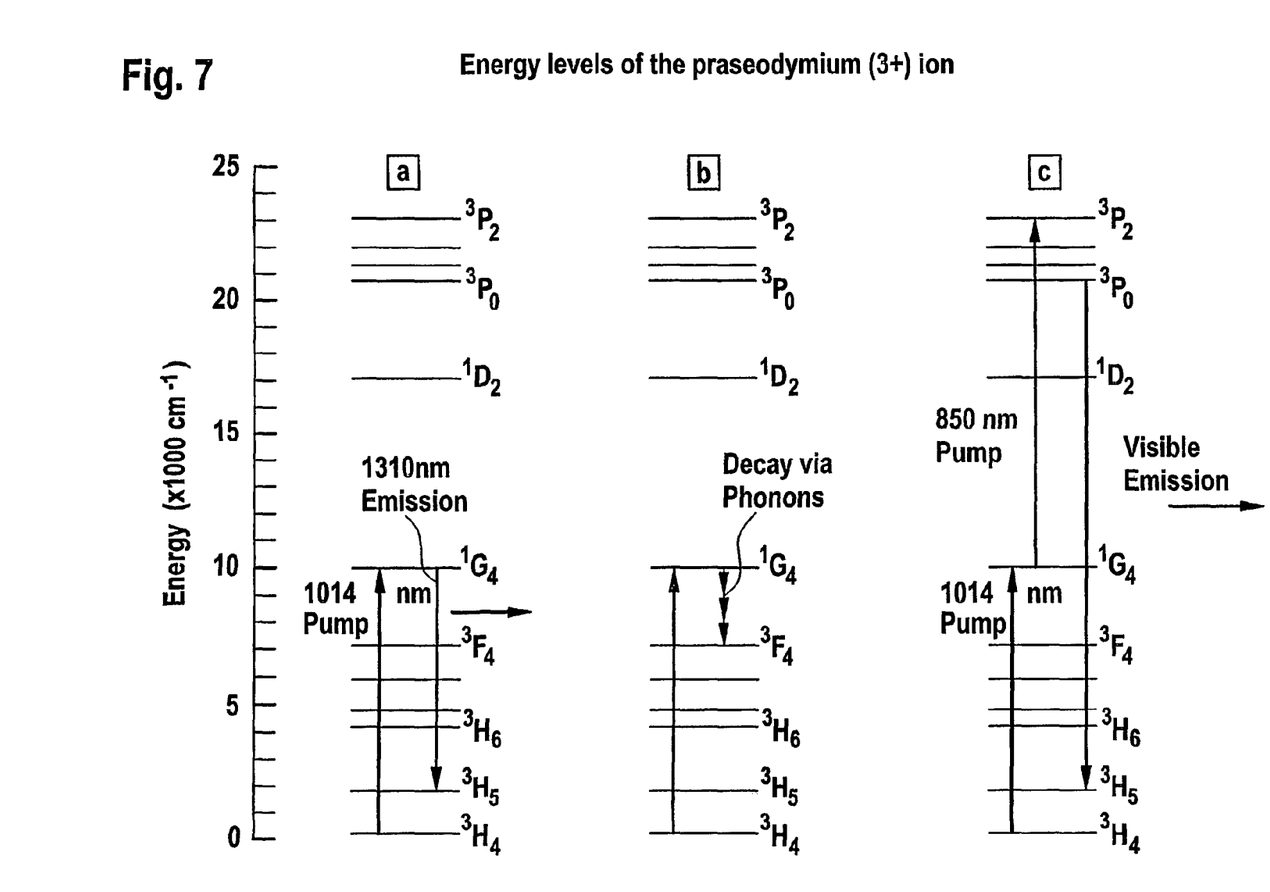
FIG. 7 shows the energy levels of the prasodymium (3+) ion.

In another particular embodiment, the device may be designed for the detection of praseodymium based up-converting materials, which must be simultaneously excited with a first laser at 1014 nm and a second laser at 850 nm, and which subsequently emit in the red at about 600 nm (FIG. 7). In the embodiment, excitation pulses P are generated by excitation sources 31 and 32 which are operated simultaneously. Pohotodetector 41 is allocated to the monitoring of the 600 nm emission. The second photodetector 42 is designed to monitor the 1310 nm praseodymium down-conversion emission, which is present as well. Depending on the desired degree of complexity and the luminescent properties of the probe marking M-P, even more excitation light sources and/or photodetectors may be incorporated.

Figure 6:
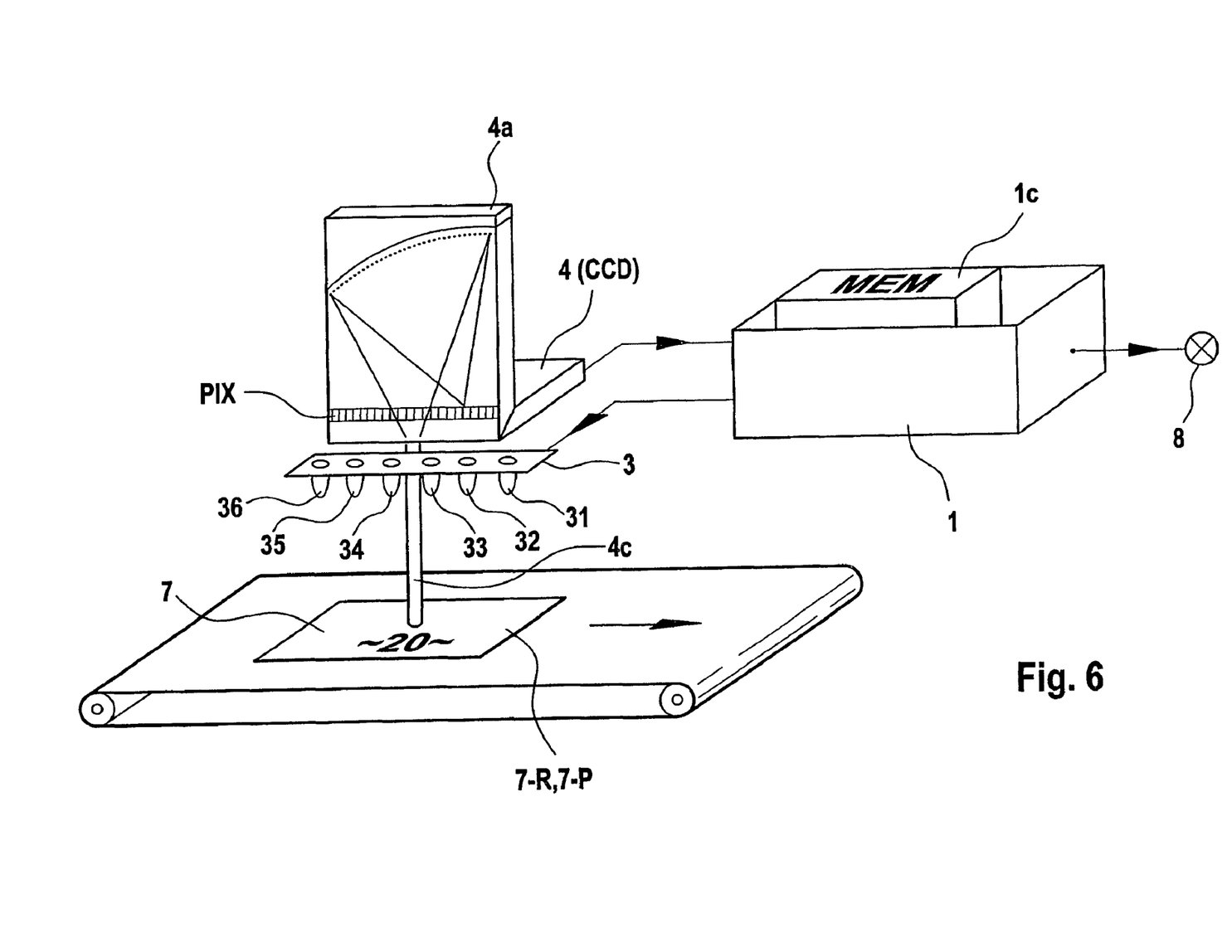
FIG. 6 shows a schematic view of a more sophisticated embodiment of a detecting device according to the invention.

In still another, more sophisticated embodiment of an authenticating device according to the invention, schematically depicted in FIG. 6, a combination of a multiple LED or LD excitation source 3, a focussing grating type micro-spectrometer 4a' comprising a light-guide nozzle, a two-dimensional CCD array 4b' as a photodetector/acquisition device, and a processor 1 to control the acquisition, storage and evaluation of the data, is employed.

The excitation source 3 preferably comprises a series of light emitting diodes 31, 32, 33, . . . , 3n, having emission wavelengths chosen such as to cover the UV, visible and the near infrared part of the light spectrum. In particular, a set of commercially available LEDs emitting at 370 nm (UV), 470 nm (blue), 525 nm (turquoise), 570 nm (green), 590 nm (yellow), 610 nm (orange), 660 nm (red), 700 nm (dark red), 740 nm (IR), 770 nm (IR), 810 nm (IR), 870 nm (IR), 905 nm (IR) and 950 nm (IR) has proven to be useful. These LEDs may be disposed at the user's convenience, but are preferably arranged in a circle around the micro-spectrometer's light-guide nozzle.

Figure 8:
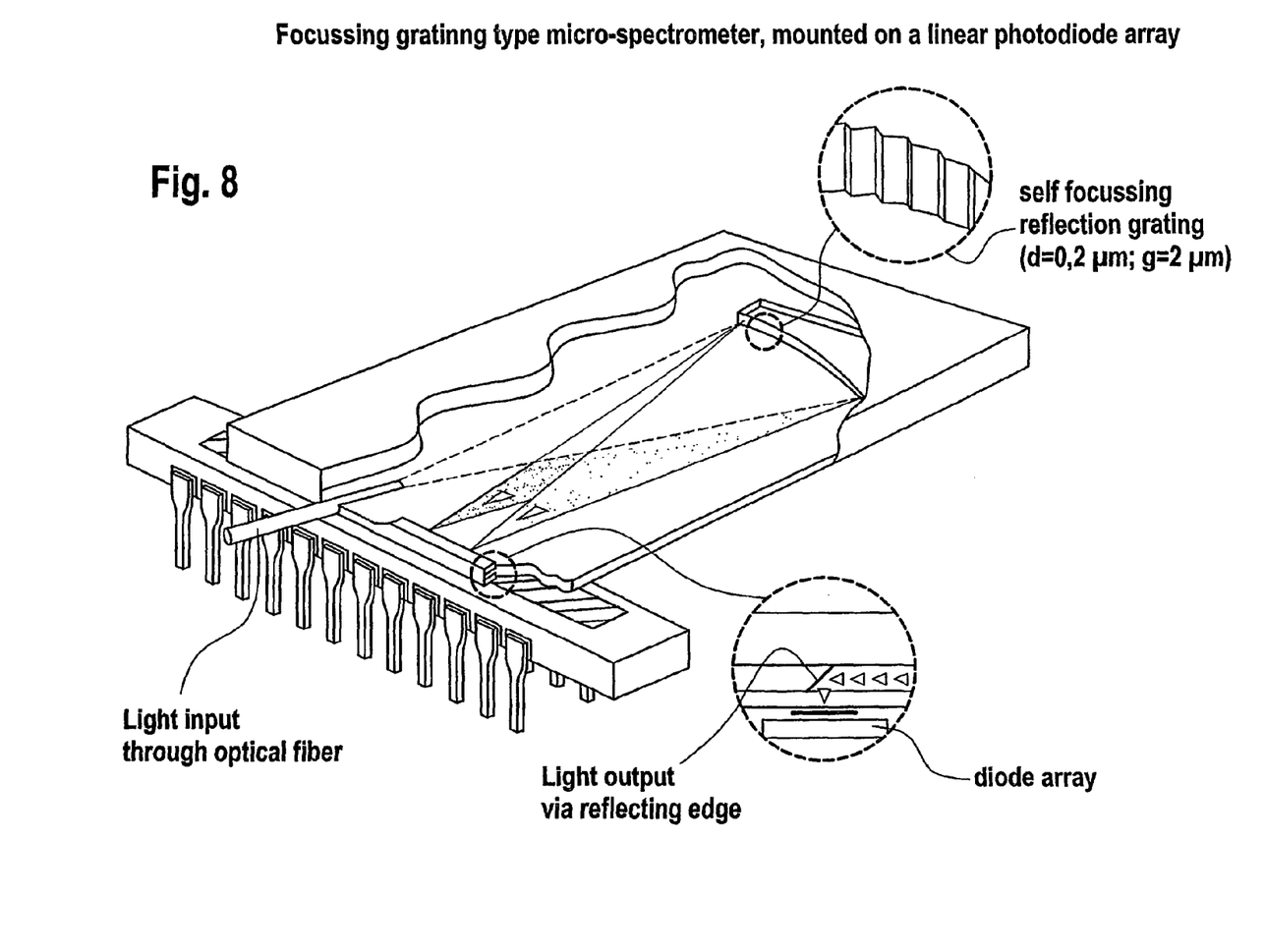
FIG. 8 shows a focussing grating type micro-spectrometer, mounted on a linear photodiode array.

The focussing grating type micro-spectrometer 4a' is a device according to FIG. 8. Light from the probe is coupled into the focal plane of the spectrometer by an optical fiber or light-guide nozzle which acts as a point-shaped light source, illuminating a self-focussing reflection grating. This latter focuses the light back onto a linear photodetector array, dispersing the different wavelength components comprised in said light onto adjacent pixels of said array. A spectrum of the light from the probe is thus obtained by reading out the pixels of the photodetector array.

Figure 9A:
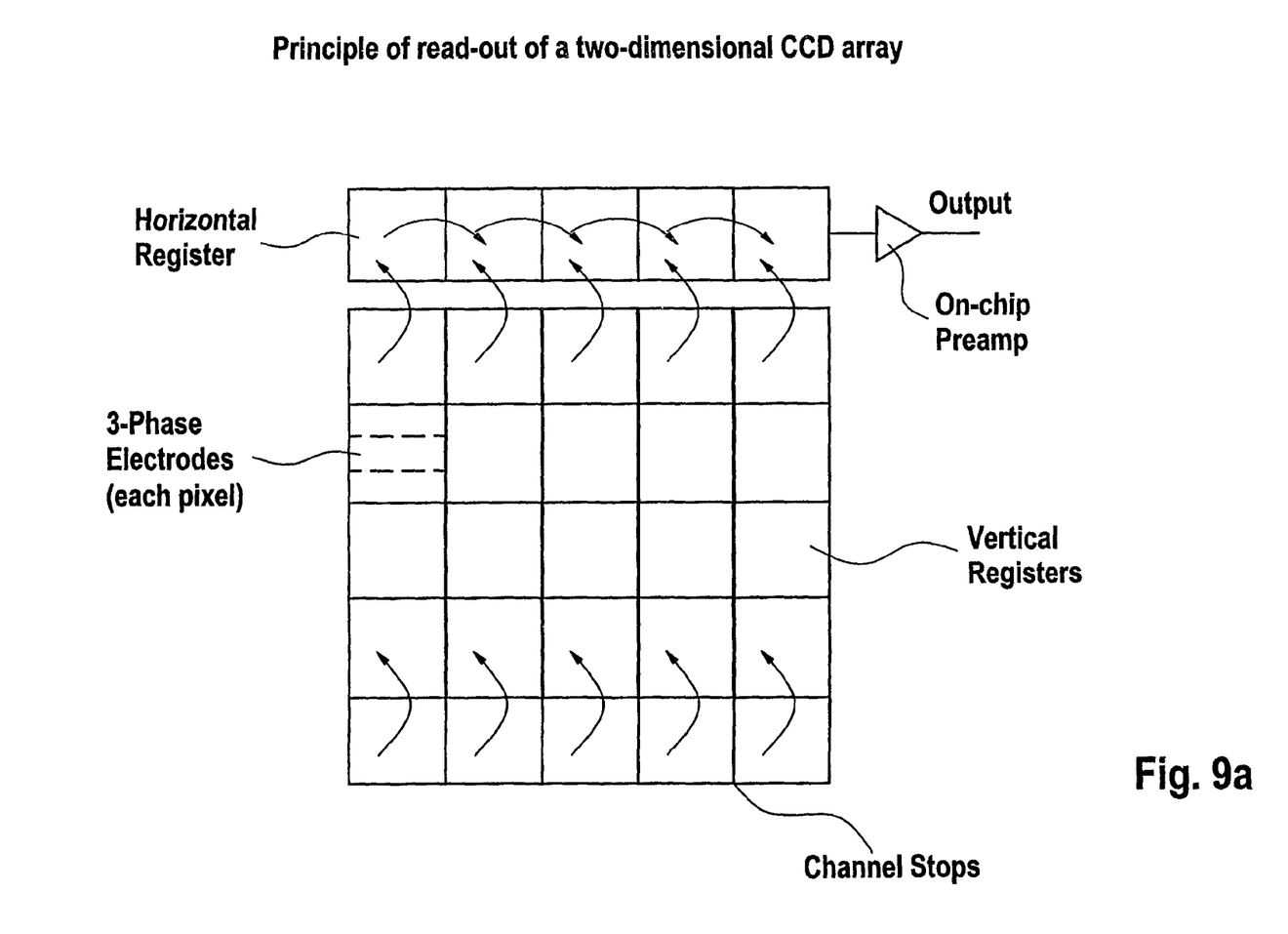
FIG. 9a shows the principle of read-out of a two-dimensional CCD array.
Figure 9B:
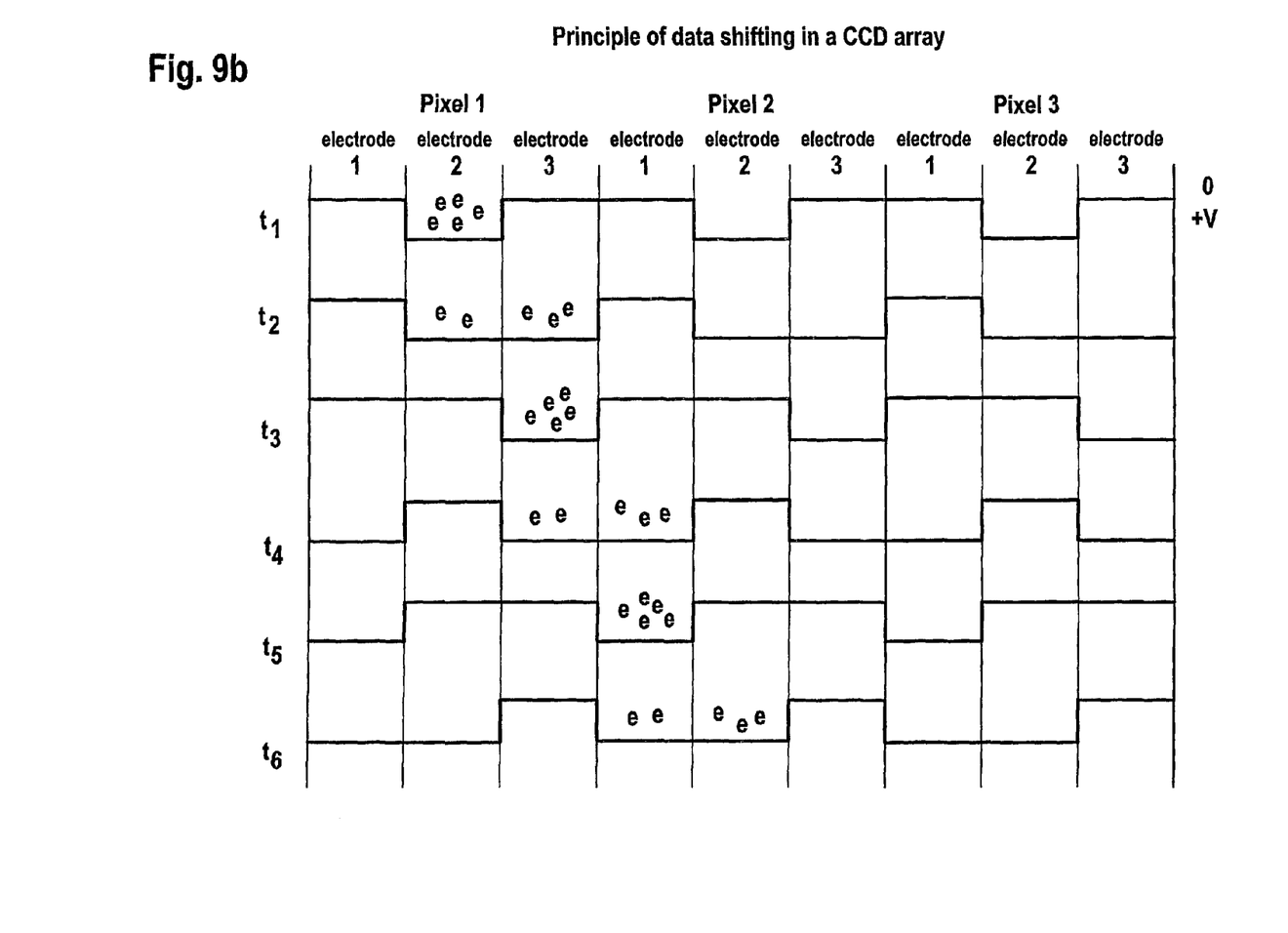
FIG. 9b shows the principle of data shifting in a CCD array.

For the rapid acquisition of time-dependent spectral information, a two-dimensional charge coupled device (CCD) array 4b' is used. Such CCD arrays comprise a two-dimensional field of photosensitive pixels, which can be read out through a shifting process according to FIG. 9a: Pixels are first shifted "vertically", line by line, into a horizontal register. There, the individual pixels are shifted "horizontally", pixel by pixel, to a preamplifier and further to the output. Two-dimensional CCD arrays are normally used in video cameras and may comprise between 256 and 1K pixels in each dimension. The shifting of pixel information, present as stored photo-generated electrons, is explained in FIG. 9b: Three electrodes (1, 2, 3) are present for each pixel, which are driven with triphase positive clock signals ($\phi1$, $\phi2$, $\phi3$). The electrons always accumulate in positive potential wells, represented by a "down" state. The up and down phases of the clock signals are made to overlap such as to result in a shift of the stored electrons of the whole array by one pixel after a clock period (t1 to t6), i.e.:

|     | t1   | t2   | t3   | t4   | t5   | t6   |
| --- | ---- | ---- | ---- | ---- | ---- | ---- |
| φ1: | up   | up   | up   | down | down | down |
| φ2: | down | down | up   | up   | up   | down |
| φ3: | up   | down | down | down | up   | up   |

In the context of the invention, a first line of photosensitive pixels (PIX) of said two-dimensional CCD array serves as the linear photodetector array of said microspectrometer device 4a'. The remaining lines of CCD pixels are not used as photosensors, but are protected from light influence and play the role of a primary storage device for the time-dependent spectral information.

The processor 1 with its memory device 1c controls the data acquisition and treatment process, performing the steps of: pulsing the appropriate diode or diodes of excitation source 3, in order to excite the luminescence marking of probe sample 7-P respectively reference sample 7-R, following the light pulse, performing an appropriate number of line-shiftings in the CCD array, in order to record the time-dependent spectral response information as a two-dimensional picture frame in the protected area of said array, reading out the time-dependent spectral response information from the CCD array and storing it in the memory device 1c, post-treating and evaluating the collected time-dependent spectral information in terms of the authentication task to be performed.

The achievable time resolution is determined by the line-shifting frequency of step b). This latter can be as high as 4 MHz, corresponding to a time step of 250 ns. The read-out of the accumulated data of step c) may occur much more slowly, in a way known to the skilled in the art. The available data after step c) corresponds to a "picture frame", having a spectral dimension and a time dimension. A time-decay curve can be obtained from this frame by slicing out a time-fringe at the appropriate wavelength; this information can be treated and evaluated as given in the one-dimensional examples above. The analysis can, alternatively, be extended to more than one wavelength, or also combined with spectral analysis, taking profit of the second dimension of the acquired data frame.

The invention claimed is:

1. A method for authenticating a luminescent probe marking, said method comprising steps of:
    exciting said luminescent probe marking with at least one excitation pulse of at least one excitation source,
    measuring probe intensity values of emission radiation of said luminescent probe marking in response to said at least one excitation pulse at time intervals,
    forming a probe intensity-versus-time emission function of said probe intensity values,
    normalizing said probe intensity-versus-time emission function, and then
    comparing said probe intensity-versus-time emission function with at least one reference intensity-versus-time emission function.

2. A method according to claim 1, wherein
    said luminescent probe marking is part of a probe sample to be authenticated, and
    specific emission characteristics of said luminescent probe marking are measured, said specific emission characteristics including at least one excitation wavelength of said excitation pulse, at least one emission wavelength of said emission radiation and probe intensity values of emission intensity at time intervals for at least one said emission wavelength.

3. A method according to claim 2, wherein
    said at least one luminescent reference marking is part of a reference sample and
    specific emission characteristics of said at least one luminescent reference marking are measured,
    said specific emission characteristics including at least one excitation wavelength of said excitation pulse, at least one emission wavelength of said emission radiation and reference intensity values of emission intensity at time intervals for at least one said emission wavelength.

4. A method according to claim 3, wherein reference intensity values, at least one reference intensity-versus-time emission function or reference intensity values and at least one reference intensity-versus-time emission function are stored in at least one memory device.

5. A method according to claim 4, wherein said at least one reference intensity-versus-time emission function is stored in a normalized form or in a non-normalized form.

6. A method according to claim 1, wherein said luminescent probe marking or a respective reference marking are excited with at least one excitation pulse from at least one excitation source selected from the group consisting of laser and light emitting diode.

7. A method according to claim 1, wherein said luminescent probe marking or a respective reference marking are excited with at least one excitation pulse of electrons.

8. A device for authenticating a luminescent probe marking, said device comprising:
    at least one detector for measuring probe intensity values of emission intensity from emission radiation of said luminescent probe marking in response to at least one excitation pulse generated by at least one excitation source at time intervals,
    at least one processor for forming a probe intensity-versus-time emission function of said probe intensity values,
    at least one processor for comparing said probe intensity-versus-time emission function with at least one reference intensity-versus-time emission function and
    at least one processor for normalizing said probe intensity-versus-time emission function prior to comparison with a normalized reference probe intensity-versus-time emission function.

9. A device according to claim 8, wherein said device comprises
    at least one memory device for storing reference intensity values of emission intensity at time intervals for at least one wavelength of emission radiation of said luminescence reference marking, for storing at least one reference intensity-versus-time emission function formed from reference intensity values or for storing reference intensity values of emission intensity at time intervals for at least one wavelength of emission radiation of said luminescence reference marking and at least one reference intensity-versus-time emission function formed from said reference intensity values.

10. A device according to claim 8, wherein said device comprises said at least one excitation source.

11. A device according to claim 8, wherein at least one detector comprises a wavelength selector.

12. A device according to claim 8, wherein said at least one detector converts emission intensity into electric signals of probe intensity values and respective reference intensity values and that said at least one processor samples said electric signals to form a probe intensity-versus-time emission function of said probe intensify values or a respective reference intensity-versus-time emission function of said reference intensity values.

13. A device according to claim 8, wherein said device comprises at least one spectrometer for differentiating between two or more emission wavelengths, said at least one detector being an array-photo detector for measuring the emission radiation at two or more emission wavelengths, allowing a simultaneous measuring of probe intensity values of emission radiation of a luminescent probe marking or a respective simultaneous measuring of reference intensity values of emission radiation of a luminescent reference marking.

14. A device according to claim 13, wherein said at least one array-photo detector is a two dimensional CCD array having a first row of photosensitive pixels serving as photo detecting array, and remaining rows of pixels serving as a primary storage device for spectral information as a function of time through a line-shifting process.

15. A security system for authentication a luminescent probe marking, said security system comprising:

a device according to claim 8, at least one reference sample comprising at least one luminescent reference marking for measuring reference intensity values of emission intensity at time intervals for at least one wavelength of the emission radiation of said luminescent reference marking and at least one probe sample comprising at least one luminescent probe marking for measuring probe intensity values of emission intensity at time intervals for at least one wavelength of the emission radiation of said luminescent probe marking.

16. A security system according to claim 15, wherein at least one of said probe samples is part of an ink and for coating composition of an article to be authenticated.

17. A security system according to claim 15, wherein at least one of said probe samples is contained in a bulk material of an article to be authenticated.

* * * * *